United States Patent
Mahmud et al.

(10) Patent No.: US 12,394,182 B2
(45) Date of Patent: Aug. 19, 2025

(54) SYSTEMS AND METHODS FOR MULTI-TEACHER GROUP-DISTILLATION FOR LONG-TAIL CLASSIFICATION

(71) Applicant: Robert Bosch GmbH, Stuttgart (DE)

(72) Inventors: Tanvir Mahmud, Austin, TX (US); Chun-Hao Liu, Fremont, CA (US); Burhaneddin Yaman, San Jose, CA (US)

(73) Assignee: Robert Bosch GmbH (DE)

( * ) Notice: Subject to any disclaimer, the term of this patent is extended or adjusted under 35 U.S.C. 154(b) by 448 days.

(21) Appl. No.: 17/949,504

(22) Filed: Sep. 21, 2022

(65) Prior Publication Data
US 2024/0096067 A1    Mar. 21, 2024

(51) Int. Cl.
*G06V 10/774* (2022.01)
*G06N 3/08* (2023.01)

(52) U.S. Cl.
CPC ............. *G06V 10/774* (2022.01); *G06N 3/08* (2013.01)

(58) Field of Classification Search
None
See application file for complete search history.

(56) References Cited

U.S. PATENT DOCUMENTS

2021/0150340 A1*  5/2021  Liu ................... G06F 40/40
2024/0320493 A1*  9/2024  Iscen ................. G06N 3/084

* cited by examiner

*Primary Examiner* — Leon Flores
(74) *Attorney, Agent, or Firm* — Dickinson Wright PLLC

(57) ABSTRACT

Methods and systems for classifying a long-tail distribution of data. Data deriving from one or more sensors is classified into a plurality of classes by using (i) a feature-extractor backbone model configured to extract features from the data, and (ii) a classifier model configured to classify the data based on the extracted features. The plurality of classes are grouped, with each group assigned to a respective teacher model. Each respective teacher model is trained with the data in its respective group, as well as the feature-extractor backbone model. The outputs of the teacher models are then merged into a final class prediction model configured to classify the data.

20 Claims, 12 Drawing Sheets

SYSTEMS AND METHODS FOR MULTI-TEACHER GROUP-DISTILLATION FOR LONG-TAIL CLASSIFICATION

TECHNICAL FIELD

The present disclosure relates to improving classifier models in a machine-learning system. Particular embodiments disclosed herein relate to systems and methods for multi-teacher group-distillation for long-tail classification.

BACKGROUND

Classification is a form of data analysis that extracts models describing data classes. In machine learning, a classifier is an algorithm or set of algorithms that automatically orders or categorizes data into one or more of a set of "classes." Classification models can be trained on large sets of data. Depending on the data input into the training, the resulting distribution of the determined classes can be imbalanced. For example, a classification model trained to classify road signs detected by a vehicle camera may be trained with a larger number of images of signs that are more prevalent when driving (e.g., stop signs) compared with a smaller number of images of signs that are less prevalent (e.g., a moose-crossing sign).

SUMMARY

In one embodiment, a computer-implemented method of classifying a long-tail distribution of data includes: receiving data deriving from one or more sensors; classifying the data into a plurality of classes, wherein the step of classifying uses (i) a feature-extractor backbone model configured to extract features from the data and (ii) a classifier model configured to classify the data based on the extracted features; grouping the plurality of classes of data into a plurality of groups, wherein each group includes a number of the classes, and wherein the number of classes in each group is controllable; training a plurality of teacher models to predict classes, wherein each teacher model is trained with (i) the data in a respective one of the groups, and (ii) the feature-extractor backbone model; and after the step of training, merging outputs of the plurality of teacher models into a final class prediction model configured to classify the data.

In another embodiment, a system for classifying a long-tail distribution of data includes: an input interface configured to receive input data from one or more sensors; and one or more processors in communication with the input interface. The one or more processors are programmed to: receive the input data; classify the input data into a plurality of classes using (i) a feature-extractor backbone model configured to extract features from the input data and (ii) a classifier model configured to classify the input data based on the extracted features; group the plurality of classes of data into a plurality of groups, wherein each group includes a number of the classes; train a plurality of teacher models to predict classes, wherein each teacher model is trained with (i) the input data in a respective one of the groups, and (ii) the feature-extractor backbone model; and after the step of training, merging outputs of the teacher models into a final class prediction model configured to classify the input data.

In another embodiment, a method of training an image classifier includes: receiving image data; classifying the image data into a plurality of classes by using (i) a feature-extractor backbone model configured to extract features from the data and (ii) a classifier model configured to classify the data based on the extracted features; and training the classifier model by (A) grouping the plurality of classes of image data into a plurality of groups, wherein each group includes a number of the classes, (B) training a plurality of teacher models to predict classes, wherein each teacher model is trained with (i) the image data in a respective one of the groups, and (ii) the feature-extractor backbone model, and then (C) merging outputs of the teacher models into a final class prediction model configured to classify new image data.

BRIEF DESCRIPTION OF THE DRAWINGS

FIG. 3 shows the framework for a multi-teacher group-distillation for long tail classification, in which

DETAILED DESCRIPTION

Figure 1:
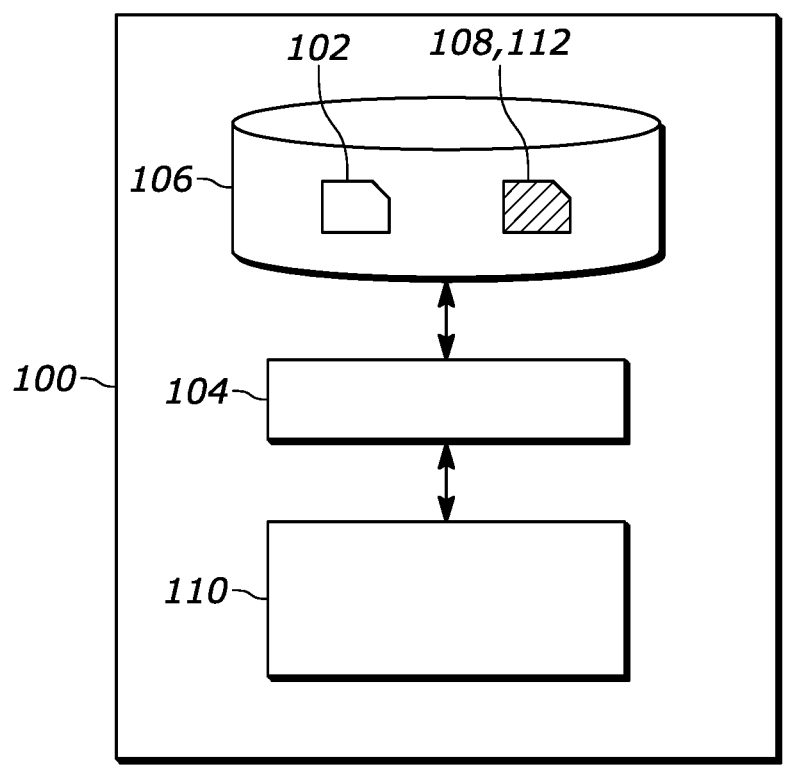
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Many machine learning models are trained on large sets of data. A classifier is a type of machine learning model that automatically orders or categorizes data into one or more of a set of "classes." Classifiers can be trained on large distributions of data. A long tail of some distributions of numbers is the portion of the distribution having many occurrences far removed from the "head" or central part of the distribution. A distribution of training data with a long tail has much more data in the major classes and much fewer data in the minor classes. Long-tail distribution with data imbalance in class distribution is a major problem for many real-world applications, particularly in computer vision domain such as image recognition, object detection, semantic segmentation, etc. Without any remedies, the model is biased towards the major classes, and it becomes increasingly difficult to achieve good performance on the minor classes. To properly utilize all the available data as well as to reduce overfitting towards major classes, specific optimization strategies should be incorporated.

Previous attempts to solve this challenge include data augmentation with class-balanced sampling, and modified loss functions. In data segmentation with class-balanced sampling, data in the minor classes are up-sampled through data augmentation, while data in the major classes are down-sampled. However, such an approach can't properly exploit the available data representation of the major classes and the performance will be biased to the largely augmented minor classes. Subsequent utilization of long-tail instance balanced sampling and class-balanced sampling is a well-established solution that can exploit the available data as well as achieve better performance on the minor classes. Nevertheless, in case of significant imbalance between the major and minor classes, such an approach may require a much larger up-sampling and down-sampling ratio that under-represents the major classes and makes the training become biased.

With modified loss function approaches, the loss function is modified to handle the effect of large class imbalances. Adaptive weighting of the classes in the loss function is one of the frequently used solution that attempts to add more weights to the minor class predictions to handle the class imbalance. However, such an approach faces similar complications with large imbalance among classes. Grouping the predictions and loss functions according to the available samples of each class is another promising solution. Despite considerable improvement of performance, the larger imbalance of the dataset can significantly under-represent the minor classes that suffers from similar challenges since the optimization is carried out on the long-tailed data with a single-phase training.

According to various embodiments, this disclosure presents systems and methods for multi-teacher group distillation for long tail classification. The disclosed framework includes subsequent training phases to adapt to the large imbalance presented in the real-world datasets. Initially, the backbone module is pretrained on the instance balanced long-tailed data with self-supervised contrastive learning to exploit all the existing data. Afterwards, the whole dataset is segmented into several groups based on the predefined imbalance ratio. A plurality of teacher models are trained on each group using the pretrained frozen backbone inheriting the all-class features with the newly introduced group specific classifiers. Two approaches are introduced for aggregating features from the teachers in a unified network. In the first approach, all the classifiers from different teachers are aggregated with the pretrained backbone and an uncertainty-based sampling is used to isolate the most certain predictions from teachers. In the second approach, a student model is trained on the whole dataset with class balanced sampling, and the soft predictions are extracted from the particular teacher responsible for the respective sample data. The soft distillation of knowledge is carried out between the predictions from students and their respective teachers.

Figure 2:
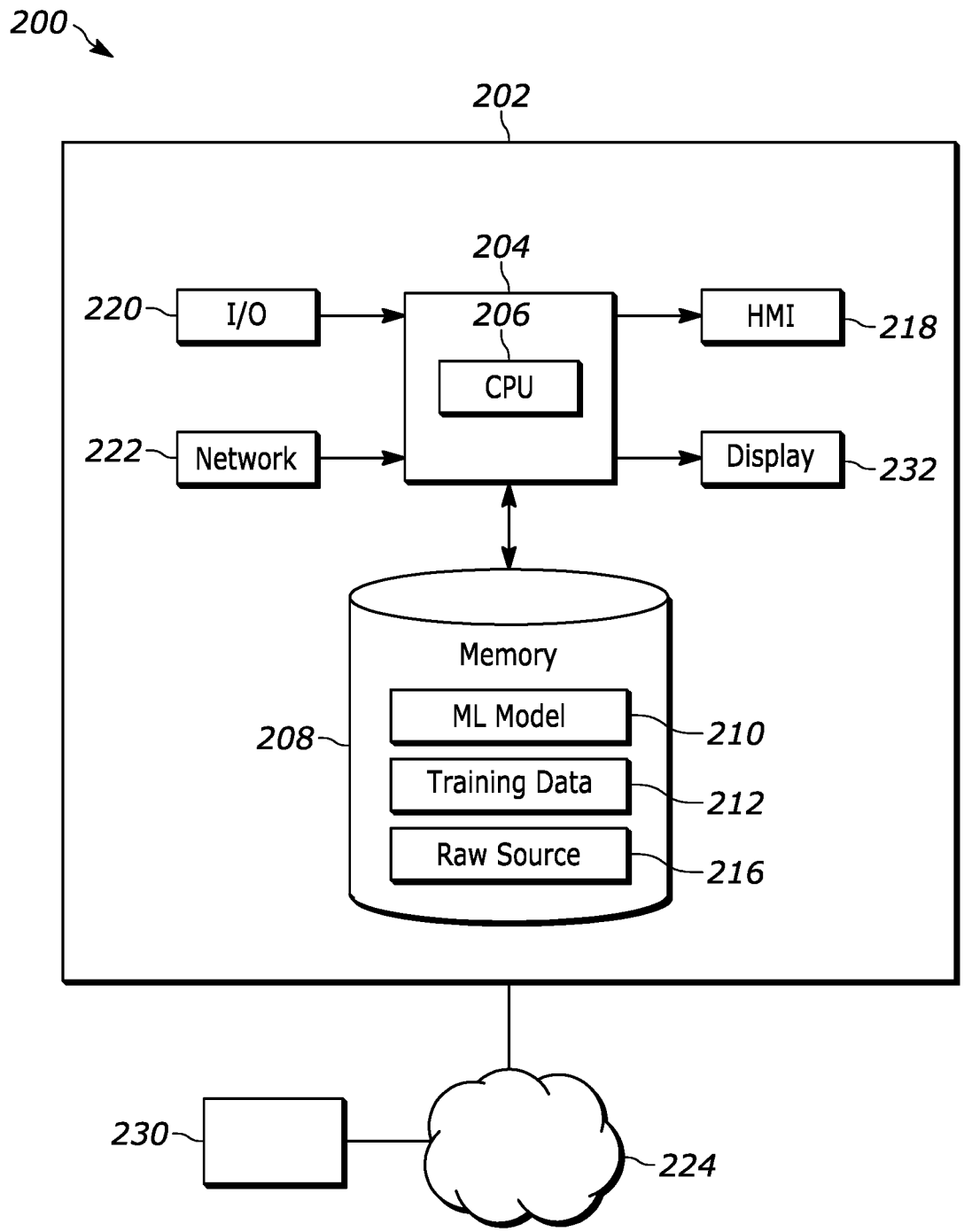
FIG. 2 shows a computer-implemented method for training and utilizing a neural network, according to an embodiment.

Before describing these methods and systems in detail, reference is made to FIGS. 1-2 which show a system for training a machine learning model (e.g., classifier, neural network, etc.), and utilizing the model, according to an embodiment. Referring to FIG. 1, a system 100 for training a neural network, such as a deep neural network, classifier, class prediction model, teacher model, student model, and the like.

The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the image-to-image machine-learning model and the mixer machine-learning model described herein. Additional structure for operating and training the machine-learning models is shown in FIG. 2.

FIG. 2 depicts a system 200 to implement the machine-learning models described herein, for example the classifiers, teacher models, student models, backbone feature-extractor model, etc. The system 200 can be implemented to perform image classification processes described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines; timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display). The sensor providing the input to the input interface may be a camera, radar sensor, LiDAR sensor, ultrasonic sensor, motion sensor, or others.

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). Several different examples of inputs are shown and described with reference to FIGS. 5-11. In some examples, the machine-learning algorithm 210 may be a neural network algorithm (e.g., deep neural network, classifier) that is designed to perform a predetermined function. For example, the neural network algorithm may be configured in automotive applications to identify objects such as pedestrians, vehicles, street signs, or buildings in images. The machine-learning algorithm(s) 210 may include algorithms configured to operate the models described herein.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

Given the above description of the machine-learning models, along with the structural examples of FIGS. 1-2 configured to carry out the models, FIG. 3 illustrates a framework for training a classifier model, including a system for multi-teacher group-distillation for long-tail classification. In particular, FIG. 3A illustrates the training of a classifier and backbone feature-extractor models. First, the training data is classified into a plurality of classes using the feature-extractor backbone model and classifier model. Then, as shown in FIG. 3B, the classes of data are grouped, with each group including a number of the classes. Then, as shown in FIG. 3C, a teacher model is assigned to a respective one of the groups. Each teacher model is trained with the backbone feature-extractor model and the data in its respective group. Then the output of each teacher model is aggregated or combined to create a trained class prediction model, and FIGS. 3D and 3E show two different embodiments of doing so. In FIG. 3D, the system assigns an uncertainty score to the output of each teacher model, and the final class prediction model classifies the input data based on the uncertainty scores. In FIG. 3E, the system trains a student model that can learn from the output of the teacher models. The classifier shown in FIG. 3A is trained based on the output of either FIG. 3D or FIG. 3E to result in a trained class prediction model. Additional detail on each one of these Figures is provided below.

The various processes illustrated in FIGS. 3A-3E can be carried out by the processors and memory described herein.

Figure 3A:
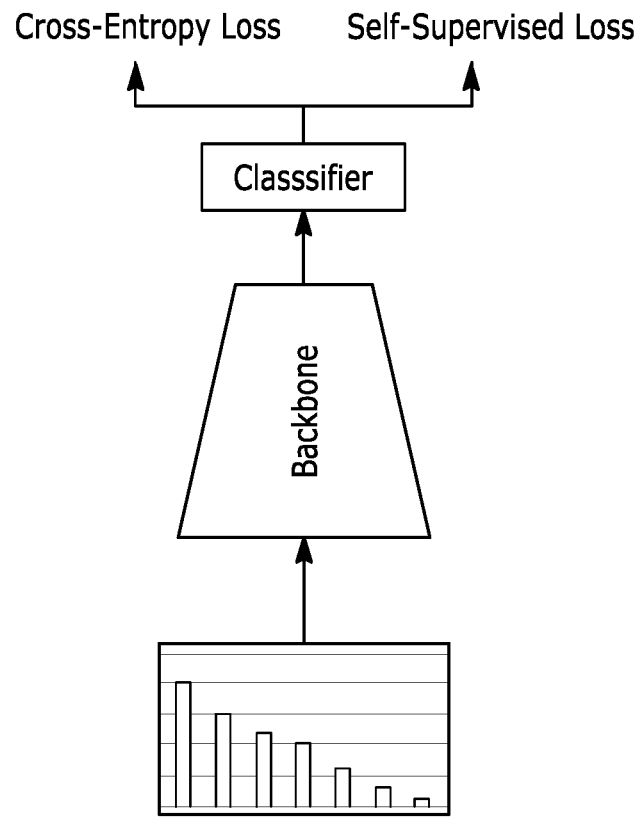
FIG. 3A shows a classifier being pre-trained on instance balanced data.

Referring to FIG. 3A, initially the whole network is pretrained on an instance-balanced dataset to exploit the common knowledge from the dataset. To learn additional context from the dataset, the pretraining objective also integrates self-supervised contrastive learning task along with the cross-entropy classification loss. Such an approach of contrastive pre-training on instance-balanced data can extract global context from the long-tailed dataset. This framework performs well to reduce the imbalance issues. After this stage, a pre-trained backbone followed by a classifier model is available for the subsequent stages.

The input data can be, for example, raw image data received from a camera or other image sensor, or other sensor described herein. The illustrated backbone is a trainable feature-extractor configured to extract features from the data so that the data can be classified. For example, the backbone can be trained to recognize a certain shape, outline, and/or color of a road sign within an image so that the pixels within that outline can be classified by the classifier as a road sign. In a deeper layer, the backbone can extract features within the road sign so that a classifier can classify exactly what type of road sign it is (e.g., stop sign, speed limit sign, etc.).

The raw data is classified by classifier such that a resulting number N of classes is provided, where $n_i$ represents the number of samples in the $i^{th}$ class. The number of samples $n_i$ in each class can vary greatly, such as the case with a long-tail distribution of classes. This is represented by the schematic in FIG. 3A where each bar of data represents a particular class with a number $n_i$ of samples in that class.

Figure 3B:
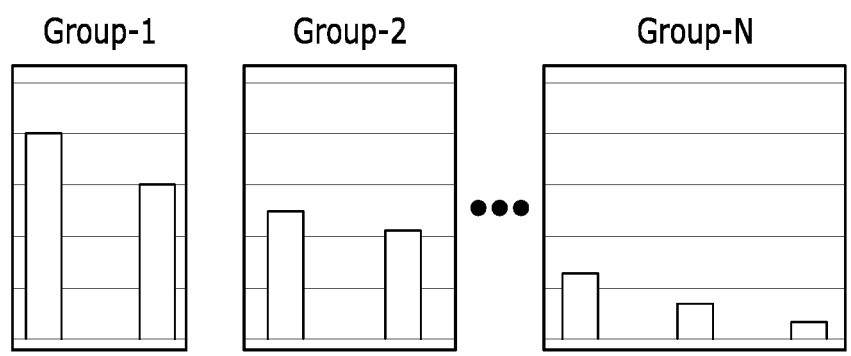
FIG. 3B shows grouping of the classed data.

A significant imbalance between the major and minor classes demands considerable up-sampling of the minor classes or down-sampling of major classes. To solve the dilemma, a data group segmentation process is shown in FIG. 3B, wherein the classes of data are grouped. In one embodiment, the grouping can be based on a predefined imbalance ratio that can be very effective to divide the classes into multiple groups. For an imbalance factor of r, the ratio of samples between the largest class $n_L^i$ and the smallest class $n_S^i$ of group i should be less than or equal to r such that $n_L^i/n_S^i \leq r$. Hence, the data imbalance on each group can be controlled based on a ratio between (i) the number of instances in the class with the largest number of instances and (ii) the number of instances in the class with the smallest number of instances. This ratio can then define the number of teachers utilized in FIG. 3C.

Figure 3C:
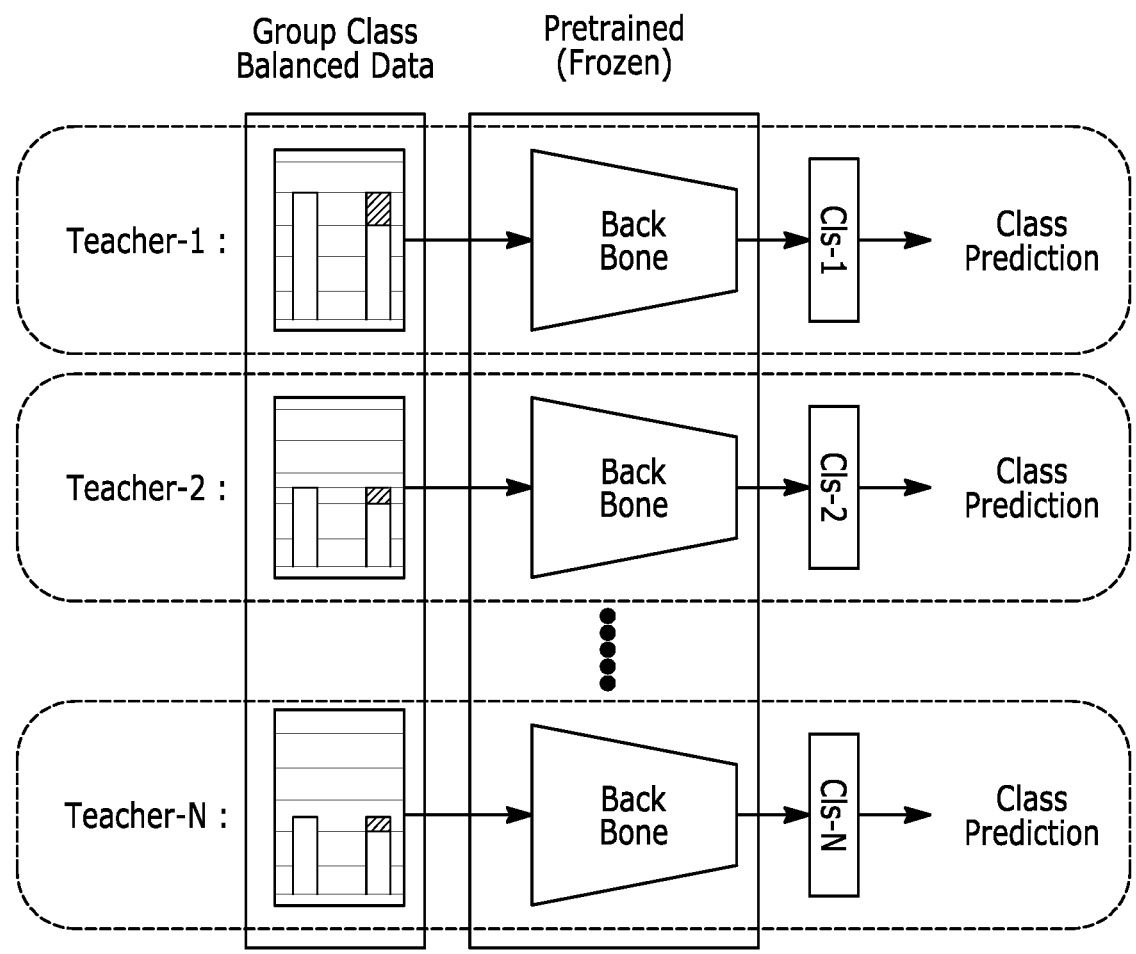
FIG. 3C shows assigning a teacher to each group to obtain class predictions from each teacher.

Referring to FIG. 3C, in this stage, teacher models are each trained on a respective group of samples. One teacher model is assigned to each group. To incorporate the knowledge extracted from the whole dataset, the backbone network is directly incorporated from the pre-trained model (FIG. 3A) on instance-balanced data. A separate classifier module is incorporated in each of the teachers to get tuned to the particular segment of the dataset. Only the classifier module is trained in this phase, while the backbone module is kept frozen in each teacher network to preserve the pretraining knowledge on the whole dataset.

Moreover, to deal with the imbalance on each group, class-balanced sampling may be incorporated by over-sampling the minor class. For example, within each group, the classes with less instances can be up-sampled so that each class within that group is similar (as shown by the shaded portion of the data instances). This may be performed by duplicating data in some classes so that the classes are balanced or substantially similar in instances within the group. Since the imbalance in each group is less severe than the whole dataset, such data augmentation greatly reduces the subsequent complications.

The class prediction outputs of each teacher model of FIG. 3C is then merged together to result in a final class prediction model. Two approaches are disclosed herein for accomplishing this, illustrated in FIGS. 3D and 3E.

Figure 3D:
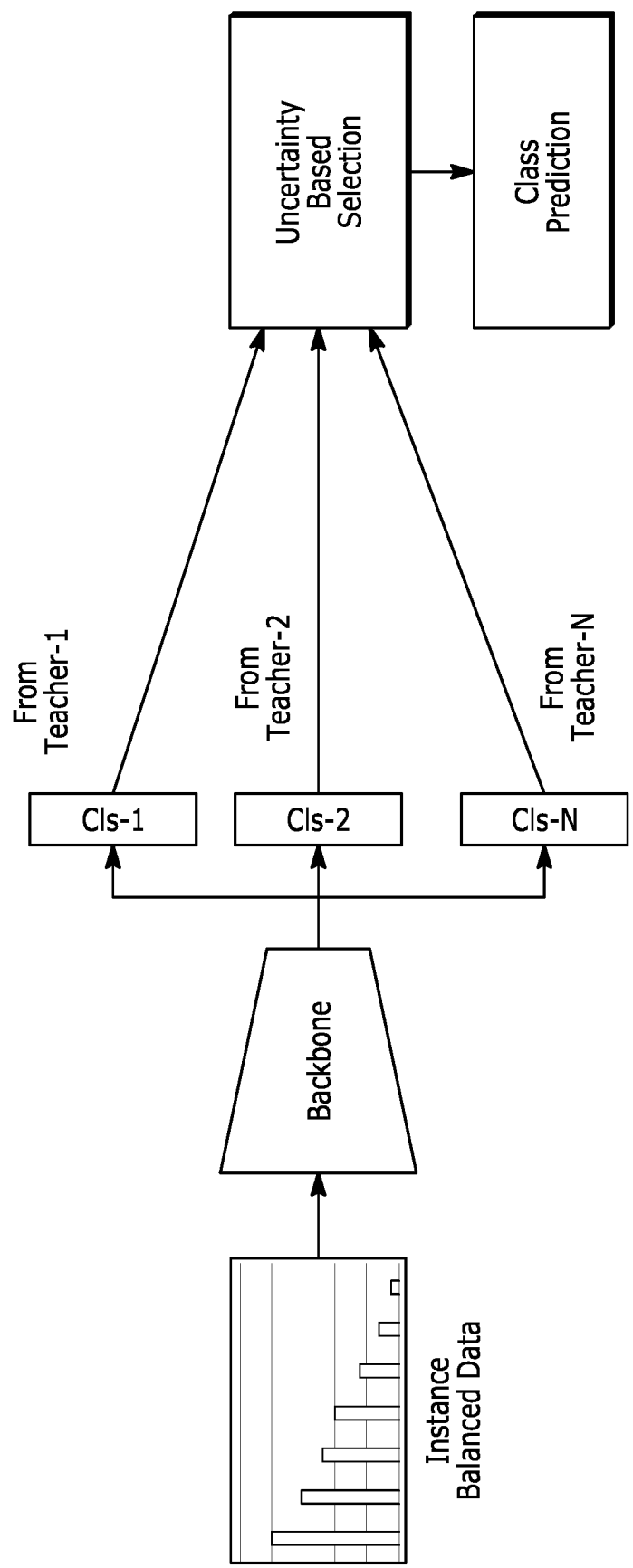
FIG. 3D shows a first approach of merging outputs of the teacher models.

FIG. 3D illustrates a first approach of merging the teacher models. According to this embodiment, the teacher models are merged in a unified network through aggregation of classifier weights. The classifier weights may include, or be based on, confidence scores.

First, the data is passed through the feature-extractor backbone model. Since all the teachers share the common backbone, the feature-extractor backbone model can be directly inherited from the teachers and frozen. Afterwards, classifier weights from each teacher are aggregated such that the system can extract different sets of predictions on the extracted features from the backbone network.

Each teacher model processes the input data and predicts the class, along with a confidence score. It follows that the teacher model that was previously trained with the data that is now being input in FIG. 3D should result with the lowest uncertainty score and thus should be weighed more heavily. Said another way, an uncertainty-based selection is made on the prediction of different teacher's classifiers that estimates the most confident class prediction. Since all the classifiers are trained for particular groups that deal with different classes, it is expected that each classifier will be more confident than others, particularly for the classes it was trained for. According to an embodiment, an entropy-based uncertainty estimation is provided based on predictions of each classifier, and the most-certain class predictions are isolated. Thus, the uncertainty U of the classifier k is given by $$U(k) = \sum_{i=1}^{N} X(i) \log X(i)$$

where X(i) denotes the prediction probability of class i. With these uncertainty estimation, a final class prediction model is provided and configured to output a final class prediction on new (unseen) data.

Figure 3E:
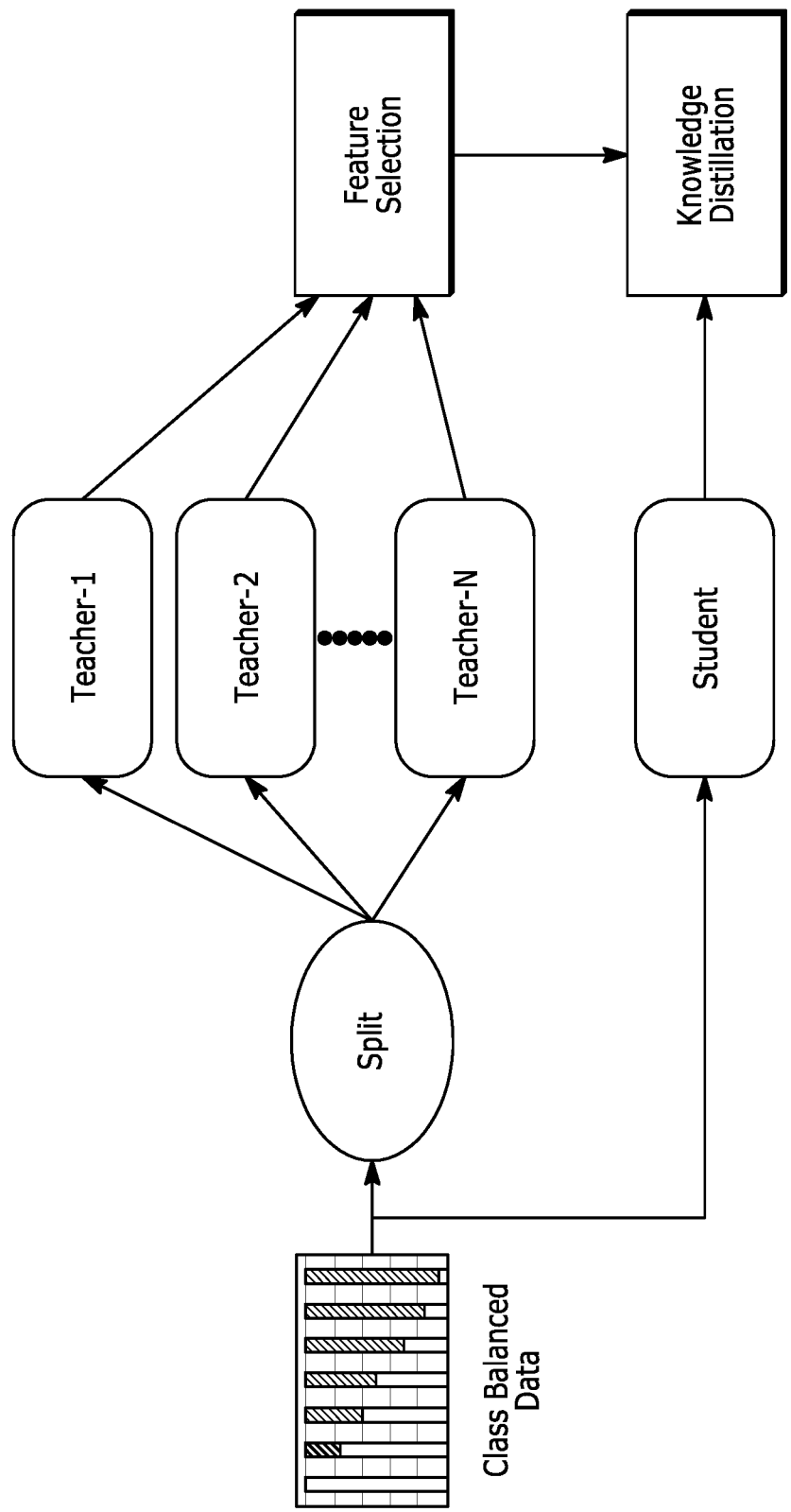
FIG. 3E shows a second approach of merging outputs of the teacher models.

The first approach in FIG. 3D may require large amounts of processing power and memory requirements. Therefore, FIG. 3E represents a second approach of integrating the multi-teacher knowledge in a unified network. Here, selective feature distillation is used. Another phase of training on the whole dataset is provided, with class-balanced sampling across the entire input dataset. In other words, the entire data is class-balanced in which each class is sampled-up to a magnitude similar or equal to the largest sample of data. This can again be provided by duplication of data instances within that class, for example. Once balanced, the data corresponding to a particular group (e.g., the data as grouped in FIG. 3B) is split or guided to the respective teacher model, where the soft class prediction (e.g., the class prediction of FIG. 3C) is extracted. Meanwhile, a student model is trained to mimic the outputs of the teacher models. The student model is trained to minimize the Kullback-Leibler divergence loss between its prediction and the respective teacher's prediction. As each teacher is optimized for a particular group utilizing all the available group samples, such an approach guides the student model to merge the knowledge of all teachers on the whole dataset. It should be noted that in this embodiment, only the student model is trained in this phase (i.e., the teacher models are frozen) and used in the inference to integrate all the knowledge from the teacher models. Of course in other embodiments not illustrated, the teacher models can be trained or otherwise improved simultaneous with the student model.

Figure 4:
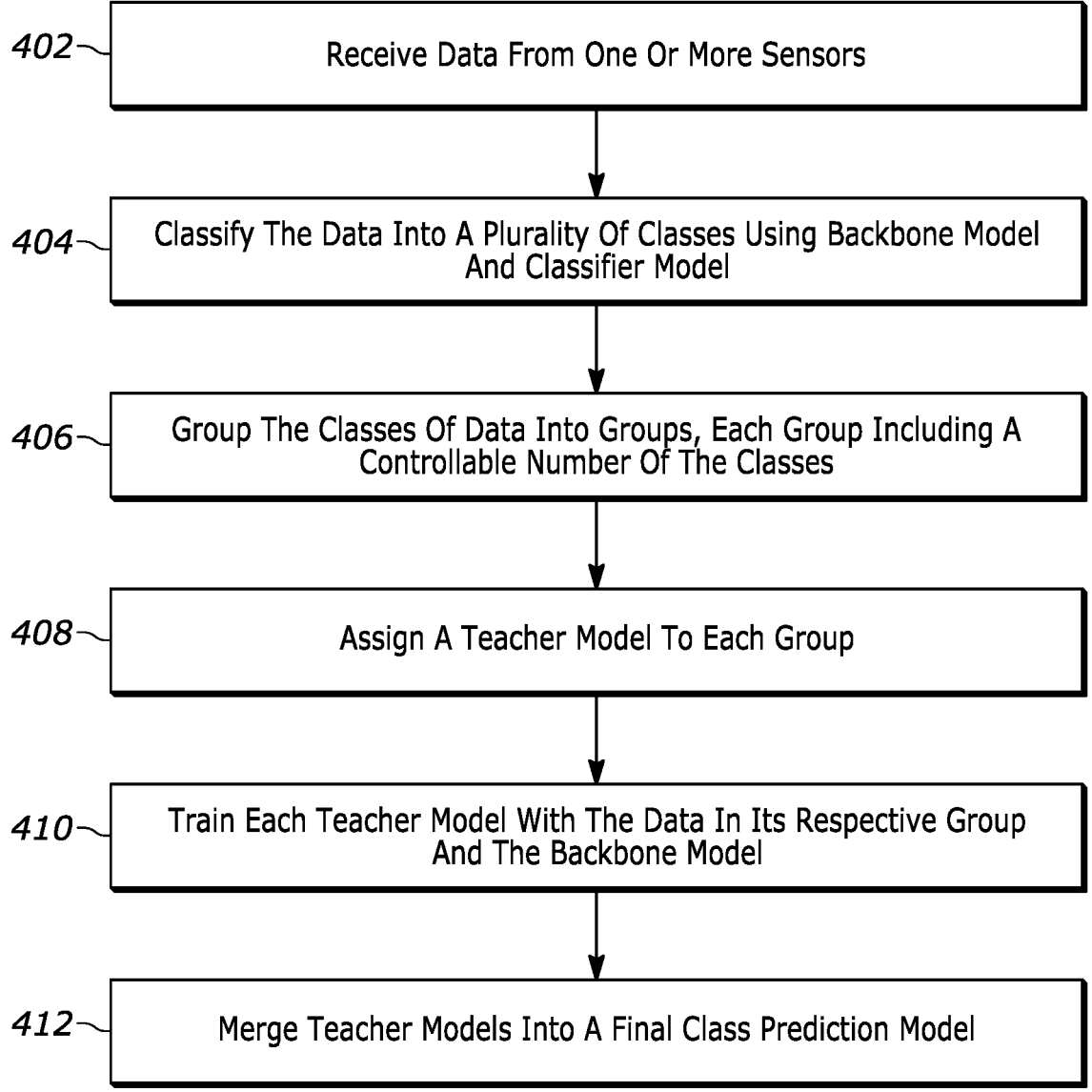
FIG. 4 shows a method of performing the multi-teacher systems and methods for long-tail classification described herein, according to an embodiment.

FIG. 4 is a flowchart of a method for implementing the multi-teacher classification system of FIG. 3, according to an embodiment. At 402, input data (e.g., image data, etc.) is received by one or more processors. The input data may originate from one or more sensors described herein (e.g., camera). At 404, the one or more processors classifies the input data into a plurality of classes using a feature-extraction backbone model and a classifier model. See FIG. 3A. At 406, the classes of data are grouped into groups, with each group including a controllable number of the classes. See FIG. 3B. The number of classes per group may be controlled based on the ratio of the number of instances in the class with the largest number of instances and (ii) the number of instances in the class with the smallest number of instances. At 408, the one or more processors assigns a plurality of teacher models to the groups, with one of the teacher models assigned to a respective one of the groups. At 410, the one or more processors trains each teacher model with the data in its respective group, and the feature-extracting backbone model from 404. See FIG. 3C. At 412, the outputs of the teacher models are merged into a final class prediction model, which represents an improved classification model. The merging of the teacher models can occur according to the two exemplified approaches explained above with reference to FIGS. 3D and 3E, respectively.

The machine-learning models described herein can be used in many different applications within the context of object recognition and classification. As described above, the system may be implemented in a semi- or fully-autonomous vehicle in which the input data is image data from one or more cameras of a vehicle, wherein the models are configured to classify objects such as pedestrians, road signs, and the like. Additional applications where these models may be used are shown in FIGS. 6-11, described below. And, structure used for training and using the machine-learning models (e.g., classifier) for these applications (and other applications) are exemplified in FIG. 5.

Figure 5:
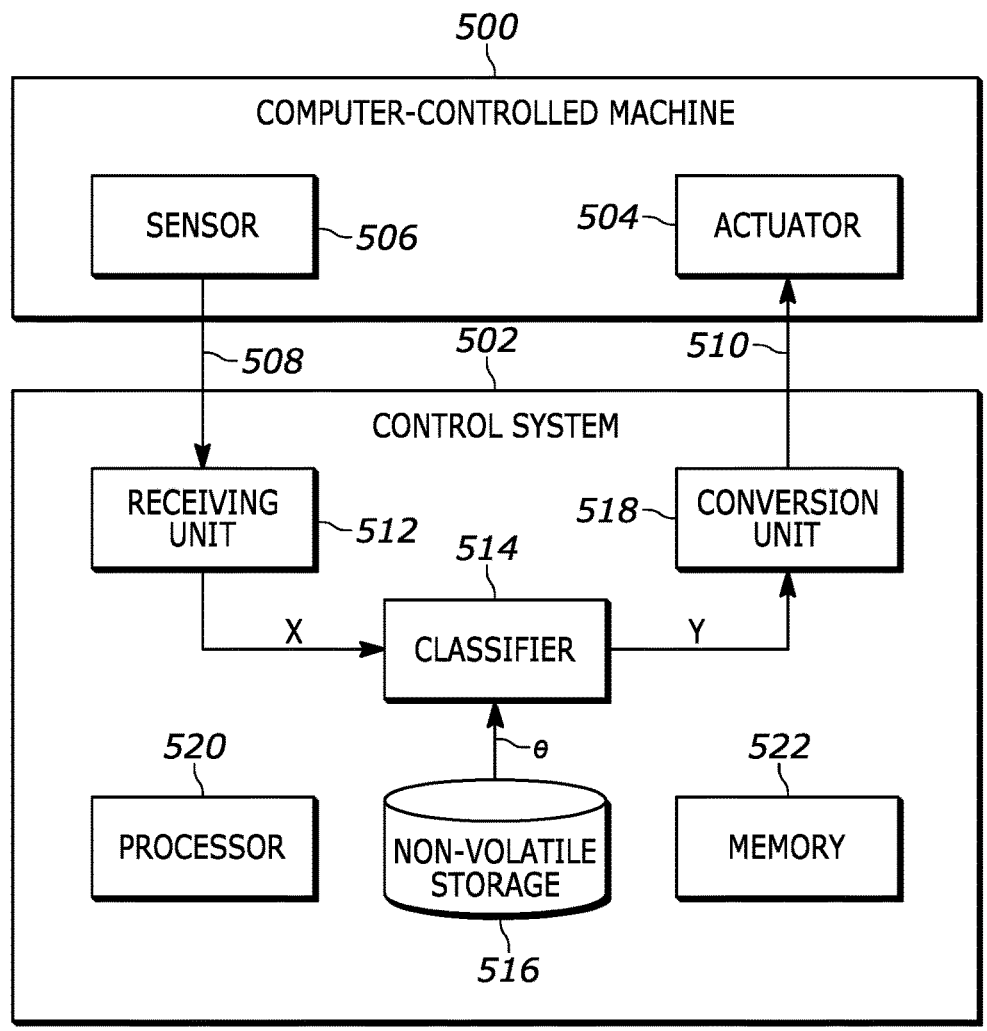
FIG. 5 depicts a schematic diagram of an interaction between a computer-controlled machine and a control system, according to an embodiment.

FIG. 5 depicts a schematic diagram of an interaction between a computer-controlled machine 500 and a control system 502, and this system may be utilized when classifying objects in the settings illustrated in FIGS. 6-11.

Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine-learning algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., the classifier or class predictions shown in FIG. 3) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more machine-learning algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the machine-learning algorithms and/or methodologies as disclosed herein. Non-volatile storage 516 may also include machine-learning data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
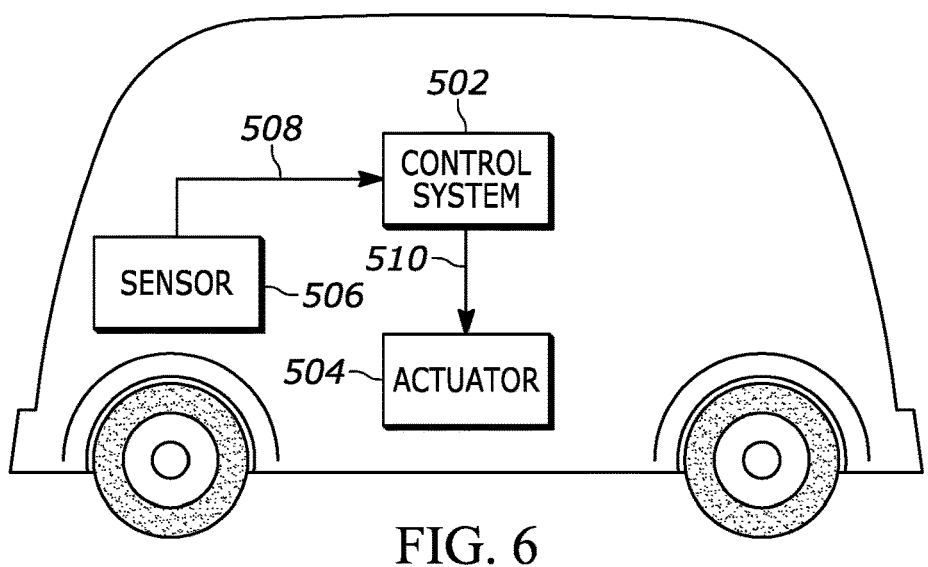
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of object-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
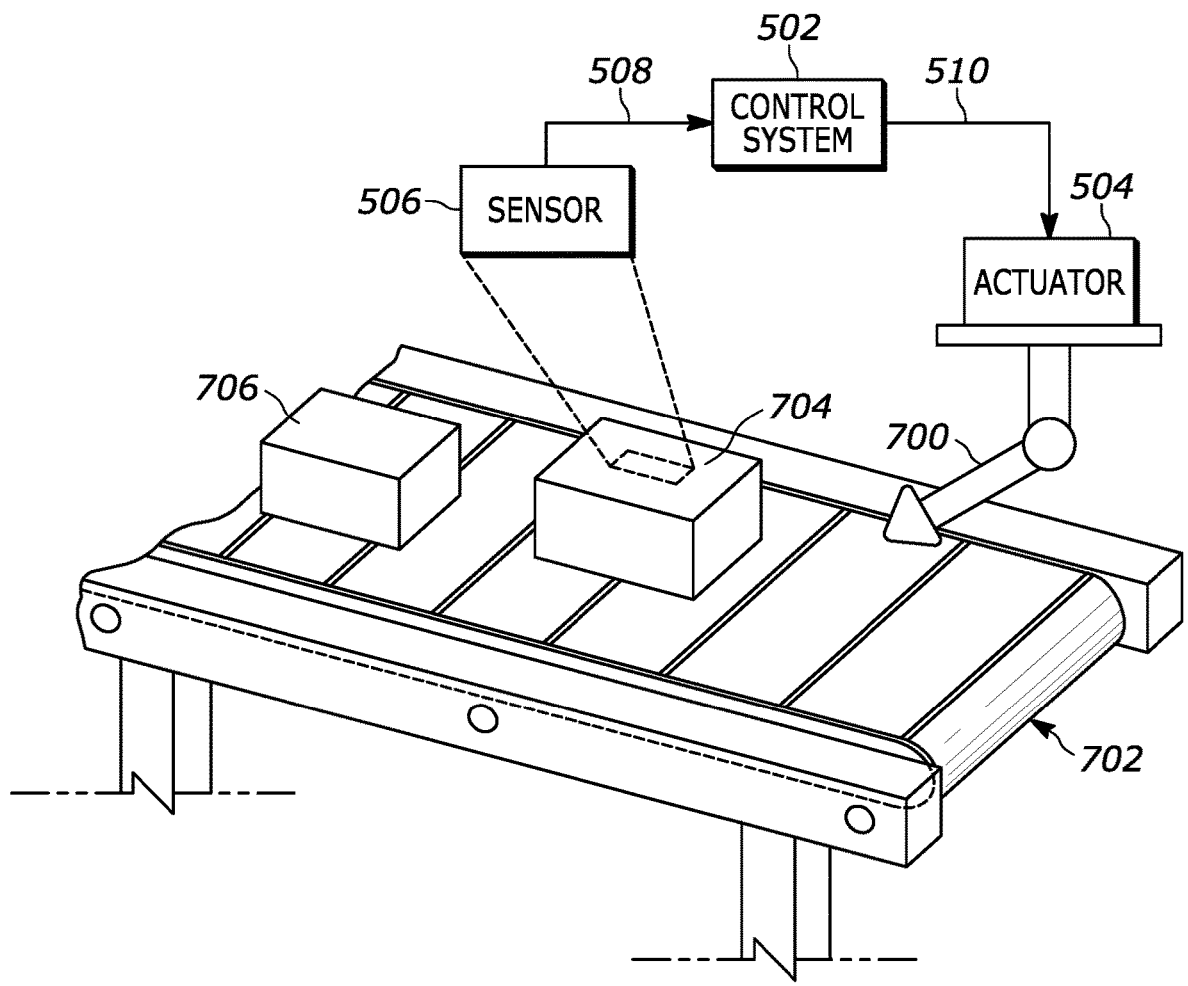
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
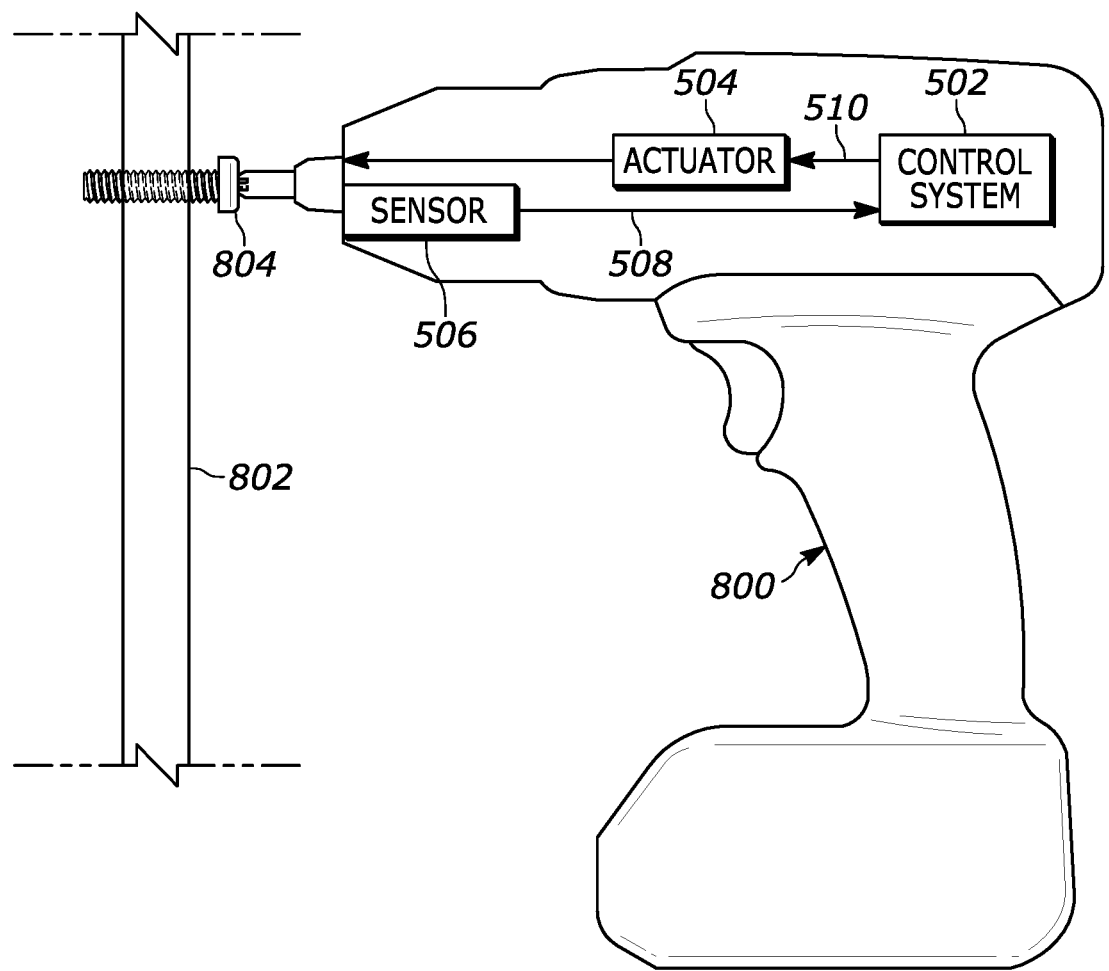
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
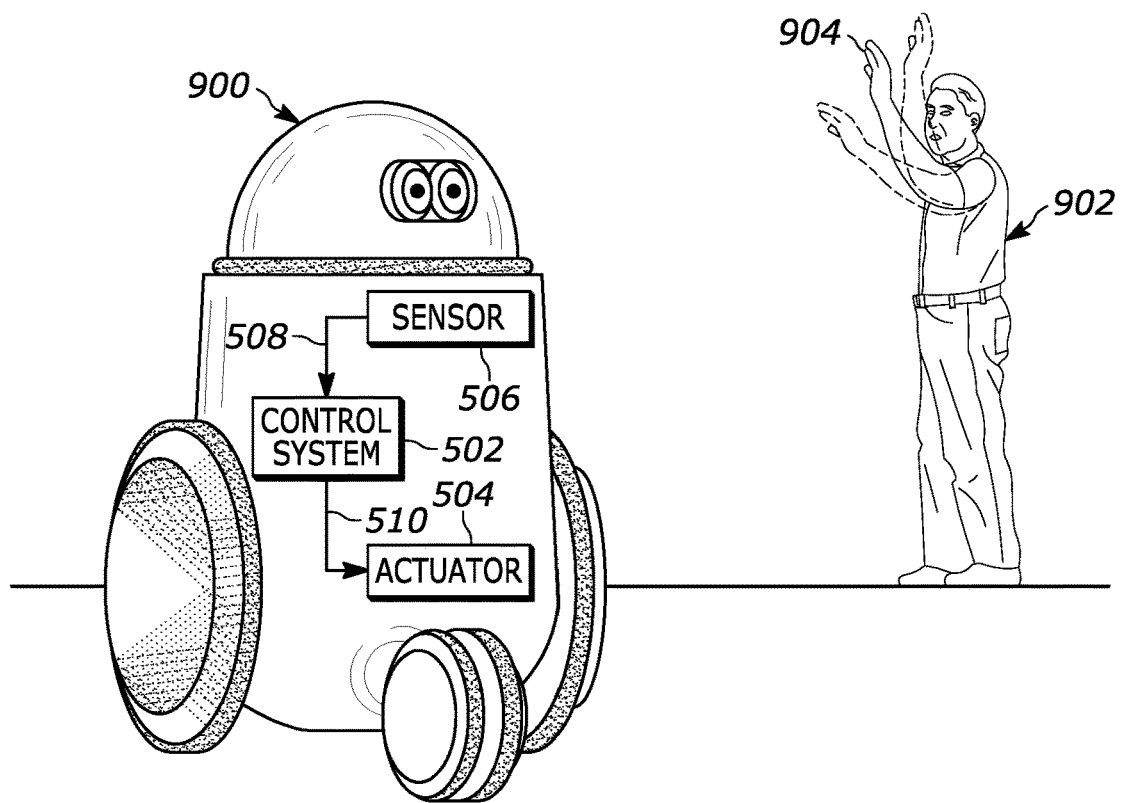
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
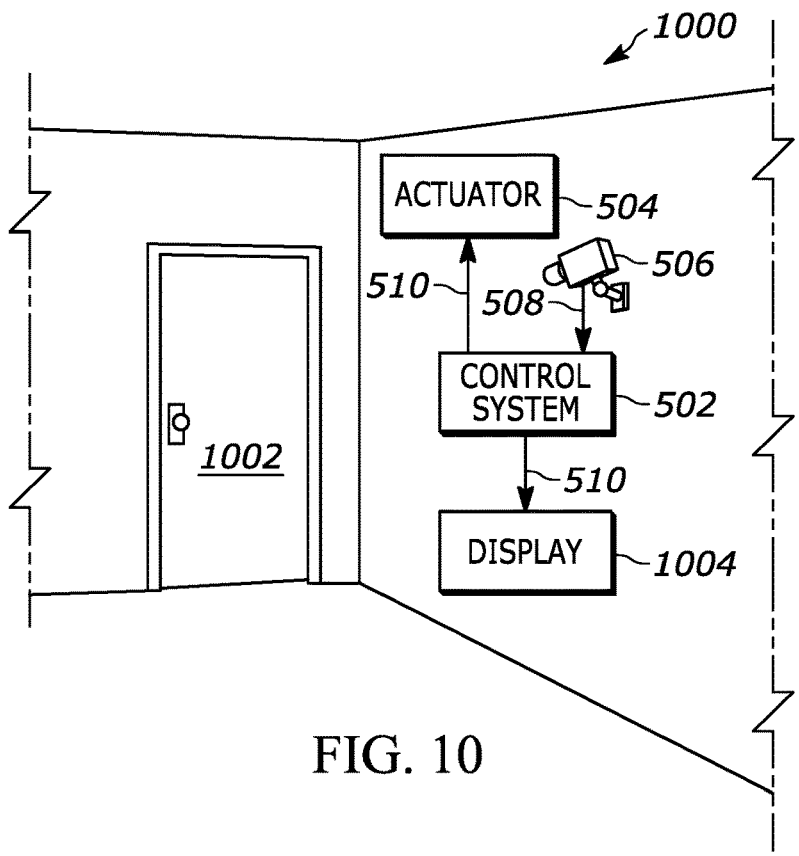
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
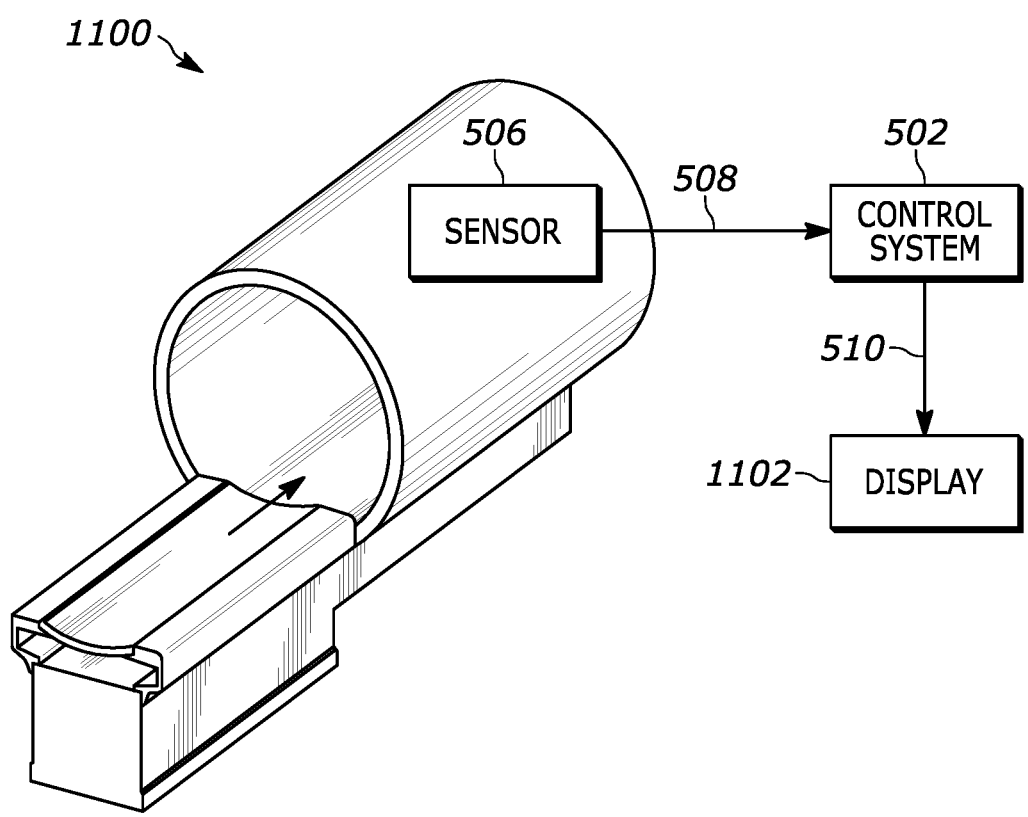
FIG. 11 depicts a schematic diagram of the control system of FIG. 5 configured to control an imaging system, for example an MM apparatus, x-ray imaging apparatus or ultrasonic apparatus.

FIG. 11 depicts a schematic diagram of control system 502 configured to control imaging system 1100, for example an MII apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method of classifying a long-tail distribution of data, the method comprising:
   receiving data deriving from one or more sensors;
   classifying the data into a plurality of classes, wherein the step of classifying uses (i) a feature-extractor backbone model configured to extract features from the data and (ii) a classifier model configured to classify the data based on the extracted features;
   grouping the plurality of classes of data into a plurality of groups, wherein each group includes a number of the classes, and wherein the number of classes in each group is controllable;
   training a plurality of teacher models to predict classes, wherein each teacher model is trained with (i) the data in a respective one of the groups, and (ii) the feature-extractor backbone model; and
   after the step of training, merging outputs of the plurality of teacher models into a final class prediction model configured to classify the data.

2. The method of claim 1, further comprising:
   assigning uncertainty scores to the outputs of each teacher model, wherein the final class prediction model classifies the data based on the uncertainty scores.

3. The method of claim 2, wherein the data classified by the final class prediction model includes a long-tailed imbalanced dataset.

4. The method of claim 1, further comprising:
   after the step of training, receiving class-balanced data in which instances of data in each class is balanced; and
   subjecting the teacher models to the class-balanced data to derive the outputs of the teacher models.

5. The method of claim 4, further comprising:
assigning the teacher models to respective groups of the class-balanced data based on the groups of data the teacher models were trained with;
wherein the step of subjecting the teacher models includes subjecting each teacher models to a respective one of the groups of the class-balanced data.

6. The method of claim 4, further comprising:
with the class-balanced data, training a student model to predict classes until convergence between outputs of the student model and the outputs of the teacher models.

7. The method of claim 1, wherein the step of training the plurality of teacher models includes augmenting the data in at least some of the classes of each group by such that the instances of data of the classes within each group is balanced.

8. The method of claim 1, wherein the feature-extractor backbone model is frozen during the step of training.

9. The method of claim 1, wherein the one or more sensors includes a camera, and wherein the data includes image data.

10. The method of claim 1, wherein the number of classes in each group is controlled based on a ratio between (i) a first one of the classes having a largest number of instances amongst the classes, and (ii) a second one of the classes having a smallest number of instances amongst the classes.

11. A system for classifying a long-tail distribution of data, the system comprising:
an input interface configured to receive input data from one or more sensors; and
one or more processors in communication with the input interface, the one or more processors programmed to:
receive the input data;
classify the input data into a plurality of classes using (i) a feature-extractor backbone model configured to extract features from the input data and (ii) a classifier model configured to classify the input data based on the extracted features;
group the plurality of classes of data into a plurality of groups, wherein each group includes a number of the classes;
train a plurality of teacher models to predict classes, wherein each teacher model is trained with (i) the input data in a respective one of the groups, and (ii) the feature-extractor backbone model; and
after the step of training, merging outputs of the teacher models into a final class prediction model configured to classify the input data.

12. The system of claim 11, wherein the one or more processors is further programmed to:
assign uncertainty scores to the outputs of each teacher model, wherein the final class prediction model is configured to classify the input data based on the uncertainty scores.

13. The system of claim 11, wherein the one or more processors is further programmed to:
after the training of the plurality of teacher models, subject the teacher models to class-balanced data to derive the outputs of the teacher models, wherein the class-balanced data includes instances of data in each class being balanced.

14. The system of claim 13, wherein the one or more processors is further programmed to:
assign the teacher models to respective groups of the class-balanced data based on the groups of data the teacher models were trained with;
wherein the subjecting of the teacher models includes subjecting each teacher models to a respective one of the groups of the class-balanced data.

15. The system of claim 11, wherein the feature-extractor backbone model is frozen during the training of the teacher models.

16. The system of claim 11, wherein the one or more sensors includes a camera, a radar sensor, an ultrasonic sensor, or a LiDAR sensor.

17. A method of training an image classifier, the method comprising:
receiving image data;
classifying the image data into a plurality of classes by using (i) a feature-extractor backbone model configured to extract features from the data and (ii) a classifier model configured to classify the data based on the extracted features; and
training the classifier model by:
grouping the plurality of classes of image data into a plurality of groups, wherein each group includes a number of the classes,
training a plurality of teacher models to predict classes, wherein each teacher model is trained with (i) the image data in a respective one of the groups, and (ii) the feature-extractor backbone model, and then
merging outputs of the teacher models into a final class prediction model configured to classify new image data.

18. The method of claim 17, wherein the outputs of the teacher models includes uncertainty scores assigned by the teacher models, wherein the classifier is trained based on the uncertainty scores of each teacher model.

19. The method of claim 17, further comprising:
Training a student model to predict classes based on the image data until convergence between outputs of the student model and the outputs of the teacher models.

20. The method of claim 17, wherein the feature-extractor backbone model is frozen during the step of training the teacher models.

* * * * *